Oct. 18, 1927.  1,645,578
G. F. BENSON
MEANS FOR PREVENTING LEAKING OF OIL FROM AXLE HOUSINGS
Filed March 12, 1924   2 Sheets-Sheet 1
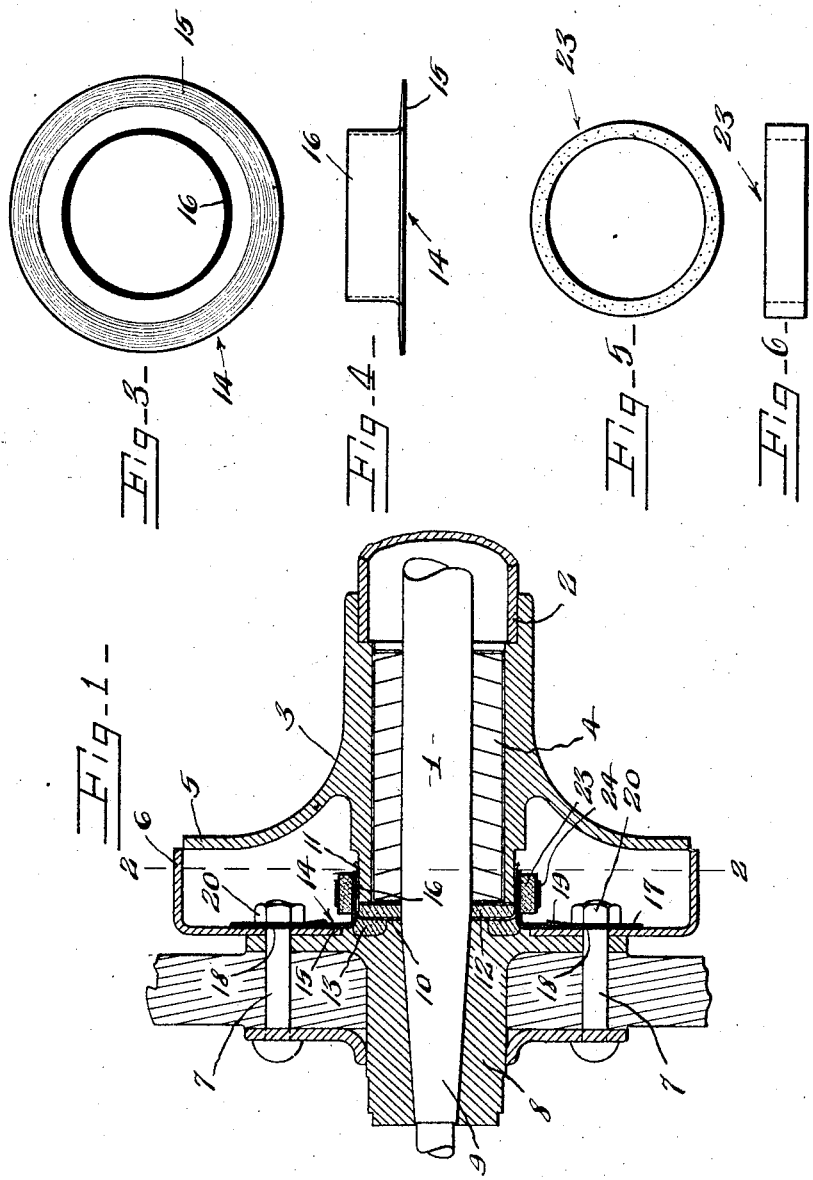

Oct. 18, 1927.  1,645,578
G. F. BENSON
MEANS FOR PREVENTING LEAKING OF OIL FROM AXLE HOUSINGS
Filed March 12. 1924   2 Sheets-Sheet 2
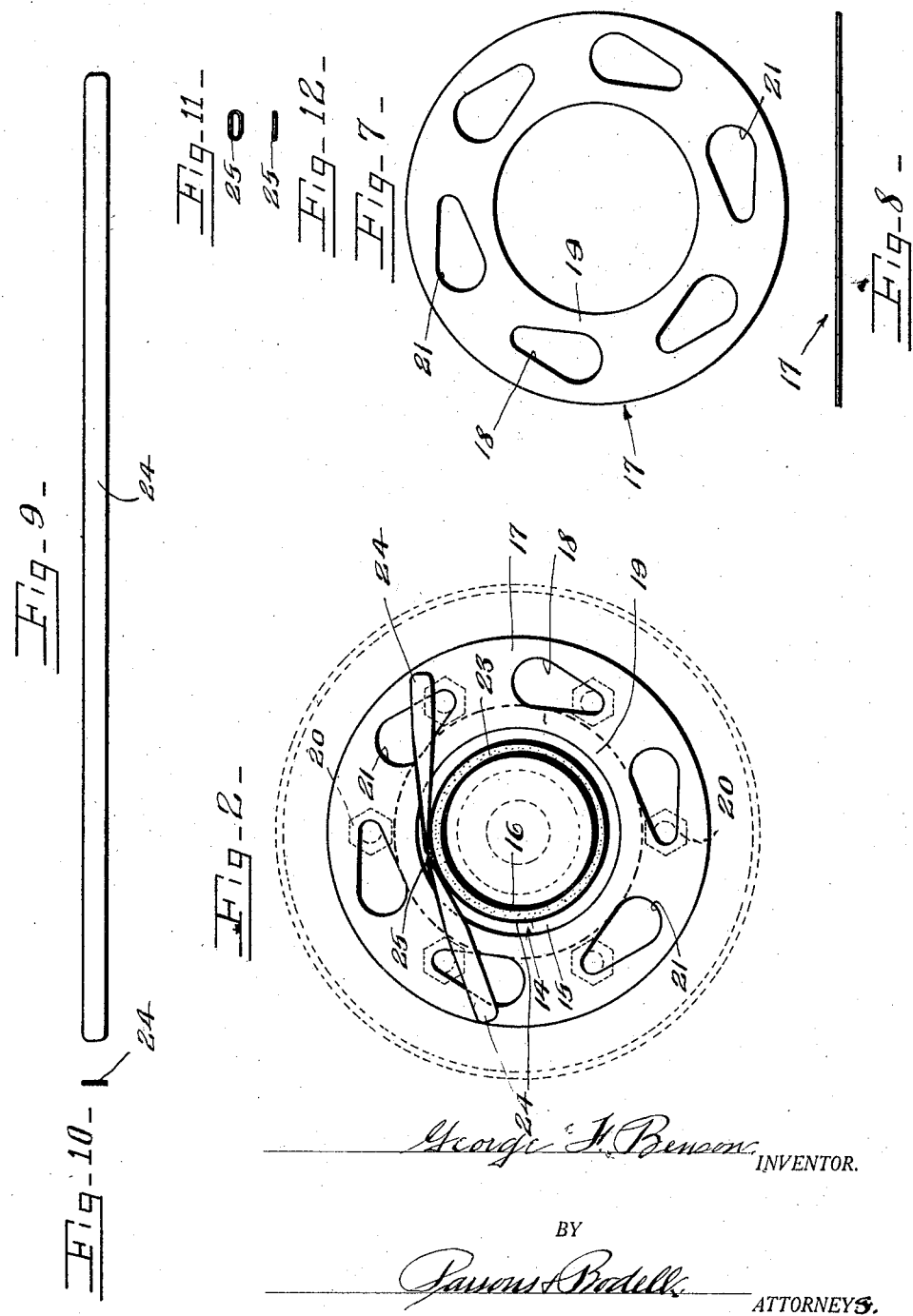

Patented Oct. 18, 1927.

1,645,578

UNITED STATES PATENT OFFICE.

GEORGE F. BENSON, OF SYRACUSE, NEW YORK.

MEANS FOR PREVENTING LEAKING OF OIL FROM AXLE HOUSINGS.

Application filed March 12, 1924. Serial No. 698,593.

This invention has for its object a means for preventing the leakage of oil from the axle housings of motor vehicles, and particularly Ford cars, which means is particularly simple in construction, economical of manufacture, readily applied to the wheels and axle housings, and highly efficient and durable in use.

The invention consists in the novel features and in the combinations and constructions hereinafter set forth and claimed.

In describing this invention reference is had to the accompanying drawings in which like characters designate corresponding parts in all the views.

Figure 1 is a sectional view of my leak preventing means, the co-operating parts of an axle, wheel, and axle housing being shown in dotted lines.

Figure 2 is a sectional view taken on line 2—2, Fig. 1.

Figures 3 and 4 are respectively a face view and an elevation of the fibrous ring shown in Fig. 1.

Figures 5 and 6 are detail views of the flexible contractable collar for holding the sleeve of the ring, shown in Figs. 3 and 4, against the axle housing.

Figures 7 and 8 are respectively a face view and an edge view of the annular plate for clamping the fibrous ring shown in Figs. 3 and 4 to the wheel.

Figures 9 and 10 are a plan view and an end view of the tape for securing the collar shown in Figs. 5 and 6, to the wheel.

Figures 11 and 12, are respectively a plan and edge view of the link through which the end portions of the tape are passed, after the tape has been wrapped around the collar.

This means for preventing the leakage of oil from axle housings, comprises a ring of fibrous or flexible material, as leather, having an annular flange which is secured to the wheel to rotate therewith, and a central sleeve or hub enclosing the wheel housing, means for securing the annular flange to the wheel and means for securing the sleeve to the wheel, whereby the ring is secured at two points, that is, at the annular flange and at the sleeve to the wheel, so that, the rotative motion of the wheel is transferred at two points to this flexible ring.

1 designates the axle or axle shaft of a Ford car, 2 the axle housing, which includes a casting 3 in which roller bearings 4 are mounted, this casting 3 having an outwardly extending annular flange 5, which closes the end of a drum 6 secured to the wheel by bolts 7. The hub 8 of the wheel is mounted on the tapered ends of the axle 1 in the usual manner.

In Ford cars means is provided for retarding the leakage of oil from the axle housings, but such means is not efficient. This means includes a cap 10 on the axle, the cap having a cylindrical portion 11 enclosing the end of the axle housing, a felt washer 12 located within the cap, between the head of the cap and the end of the axle housing, and the roller bearing 4 therein, and a second felt washer 13 on the outside of the head of the cap.

My oil preventing means is preferably used in conjunction with the standard oil preventing means herein described, and comprises a ring 14 of fibrous material as leather having an annular flange 15 lapping the inner face of the wheel or the inner face of the head of the drum 6, which is considered part of the wheel, and having a sleeve or hub portion 16 enclosing the end of the axle housing and the portion 11 of the cap 10, means for clamping the flange 15 to the wheel and means for clamping the sleeve 16 toward the periphery of the axle housing of the interposed portion 11 of the cap 10.

The means for clamping the annular flange 15 of the ring 14 to the wheel, comprises an annular plate 17 having openings 18 through which the bolts 7 pass, and also having its inner margin 19 lapping the outer margin of the annular flange 15 of the ring 14, so that, when the nuts 20 are tightened on to the plate 17, the plate is clamped against the flange 15 of the ring 14.

In order that the plate 17 may be readily applied to the wheel upon loosening of the nuts 20, the holes 18 are in the form of slots having portions 21 large enough to slip over the nuts 20, so that, after the plate has been slipped over the nuts 20 it may be given a partial rotation moving the narrow portions of the slots 18 under the nuts 20. Thus after the wheel has been removed, so that the ring 14 can be mounted on the inner side thereof and the plate 17 placed in position the nuts 20 are tightened and the ring 14 thus secured to the wheel.

The means for clamping the sleeve 16 of the ring 14 to the axle housing and securing it to the wheel, comprises a collar 23 of flexible material as felt, enclosing the sleeve 16, and a clamping element as a flexible metal tape 24, which is wrapped around the collar 23, and has its ends secured to the wheel by being inserted under two of the nuts 20. Preferably after the tape has been wrapped around the collar 23 the end portions thereof are passed through a ring 25 and the ends bent in opposite directions from the ring and inserted under two of the nuts 20, as shown in Figure 2.

Owing to the fact that the ring 14 is secured at two points to the wheel to rotate therewith, to wit, at the flange 15 and sleeve 16, there is no turning strain on the ring 14, and owing to the tape 24, the sleeve 16 of the ring 14 can be readily tightened when necessary. Obviously owing to the construction of the plate 17, the ring 14 and means for clamping the sleeve thereof to the axle having this device can be quickly applied by an unskilled mechanic to the wheel and the axle housing.

What I claim is:

1. The combination with an axle, housing, and a wheel mounted on the axle adjacent the end of the housing; of means for preventing the leakage of oil from the end of the housing, comprising a ring mounted concentric with the wheel, and secured thereto to rotate therewith, the ring having a central sleeve enclosing the end of the housing, and means rotatable with the wheel and contracting the sleeve toward the periphery of the housing.

2. The combination with an axle, housing, and a wheel mounted on the axle adjacent the end of the housing; of means for preventing leakage of oil from the end of the housing, comprising a ring secured to the wheel to rotate therewith, a second ring of fibrous material, underlying the first ring, and having a central sleeve enclosing the periphery of the housing, a collar tending to clamp the sleeve toward the periphery of the housing, and means connecting such collar and the wheel, whereby the collar and the sleeve rotate with the wheel.

3. The combination with an axle, housing, and a wheel mounted on the axle adjacent the end of the housing; of means for preventing leakage of oil from the end of the housing, comprising a ring of fibrous material having an annular flange connected to the wheel to rotate therewith, and a sleeve or hub enclosing the end of the housing, a collar of fibrous material encircling the sleeve, and means for contracting the collar on the sleeve, such means being connected to the wheel, whereby the collar and the sleeve are rotated with the wheel.

4. The combination with an axle, housing, and a wheel mounted on the axle adjacent the end of the housing, of means for preventing leakage of oil from the end of the housing comprising a ring of fibrous material having an annular flange connected to the wheel to rotate therewith, and a sleeve enclosing the end of the housing, a contractile collar encircling the sleeve, and means for contracting the collar on the sleeve, such means comprising a flexible band wrapped around the collar and having its ends secured to the wheel.

5. The combination with an axle, housing, and a wheel, mounted on the axle adjacent the end of the housing; of means for preventing the leakage of oil from the axle housing, comprising a ring having an annular flange, and a central hub enclosing the end of the axle housing, means rotatable with the axle tending to contract the sleeve toward the periphery of the axle housing, an annular plate secured to the wheel and having its inner margin lapping the annular flange of the ring and thus securing the ring to the wheel, whereby the annular flange of the ring is secured to the wheel to rotate therewith, and also the sleeve is connected to the wheel to rotate therewith.

6. The combination with an axle, housing, and a wheel mounted on the axle adjacent the end of the housing; of means for preventing leakage of oil from the end of the axle housing, comprising a ring having a sleeve enclosing the periphery of the axle housing, means for securing the ring to the wheel, comprising an annular clamping plate having a portion lapping the outer margin of the ring, and bolts passing through the wheel and the plate, a collar encircling the sleeve, and means for clamping the collar toward the sleeve, comprising a band wrapped around the collar and having its ends under the nuts of two of said bolts.

7. The combination with an axle, housing, and a wheel mounted on the axle adjacent the end of the housing; of means for preventing leakage of oil from the end of the axle housing, comprising a ring having a sleeve enclosing the periphery of the axle housing, means for securing the ring to the wheel, comprising an annular plate having a portion lapping the outer margin of the ring, and bolts passing through the wheel and the plate, the plate being formed with slots having widened portions and narrow portions, the wider portions being arranged to slip over the nuts on the bolts and the narrow portions to slip under the nuts upon partial rotation of the plate, a collar encircling the sleeve, and means for clamping the collar toward the sleeve, comprising a band wrapped around the collar and having its ends held under the nuts of two of said bolts.

8. The combination with an axle, housing, and a wheel mounted on the axle adjacent the end of the housing, of means for preventing leakage of oil from the axle housing, comprising a washer of fibrous material, encircling the axle at the end of the housing, a cap on the axle and having a portion thereof encircling the end of the housing, in combination with a ring having an annular flange secured to the wheel to rotate therewith, and a central sleeve encircling the cap, means for clamping the sleeve onto the side of the cap, and connections between said clamping means and the wheel, whereby the clamping means rotates with the wheel, and the rotary motion is transferred to the sleeve.

9. The combination with an axle, housing, and a wheel mounted on the axle adjacent the end of the housing; of means for preventing leakage of oil from the end of the axle housing, comprising a ring having a sleeve enclosing the periphery of the axle housing, means for securing the ring to the wheel, means for clamping the sleeve toward the periphery of the axle housing, comprising a tape encircling the sleeve and having its ends attached to the wheel.

In testimony whereof, I have hereunto signed my name, at Syracuse, in the county of Onondaga, in the State of New York, this 2nd day of Feb. 1924.

GEORGE F. BENSON.